United States Patent Office 3,264,348
Patented August 2, 1966

3,264,348
6-DEMETHYL-6-HALOMETHYL-5a,6-ANHYDRO-TETRACYCLINES
Robert K. Blackwood, Gales Ferry, Hans H. Rennhard, Lyme, John J. Beereboom, Waterford, and Charles R. Stephens, Jr., Niantic, Conn., assignors to Chas. Pfizer & Co., Inc., New York, N.Y., a corporation of Delaware
No Drawing. Original application Sept. 6, 1962, Ser. No. 221,870, now Patent No. 3,183,267, dated May 11, 1965. Divided and this application Oct. 9, 1964, Ser. No. 410,840
5 Claims. (Cl. 260—559)

This application is a divisional application of application Serial No. 221,870 as filed September 6, 1962, now Patent No. 3,183,267, said latter application being a continuation-in-part of now abandoned application Serial No. 72,875, filed December 1, 1960, which in turn is a continuation-in-part of abandoned application Serial No. 31,236, filed May 23, 1960.

This invention relates to new and useful antibacterial agents of the tetracycline type, salts thereof and processes for their production, as well as intermediates useful therefor.

More particularly, this invention relates to new and useful tetracyclines of the following formulae:

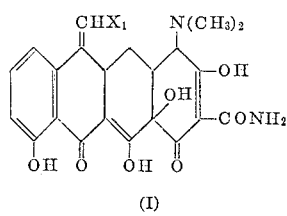

(I)

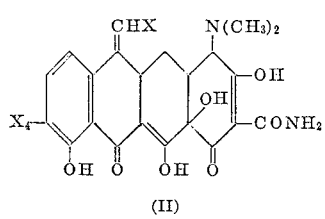

(II)

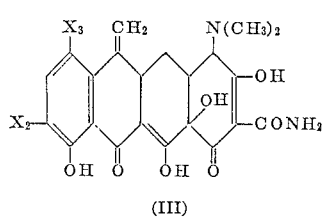

(III)

in which
X is selected from the group consisting of chloro, bromo and iodo;
$X_1$ is selected from the group consisting of chloro, bromo, iodo and nitro;
$X_2$ is selected from the group consisting of hydrogen, nitro and amino;
$X_3$ is selected from the group consisting of hydrogen and chloro; and
$X_4$ is selected from the group consisting of chloro, bromo, iodo, nitro and amino.

The present new compounds are hereinafter referred to as 6-deoxy-6-demethyl-6-methylenetetracyclines. These new compounds are useful by virtue of their high antibacterial activity and also as intermediates for the preparation of compounds of high antibacterial activity, as hereinafter described.

The present new compounds are prepared by 11a-dehalogenation of 11a-halo compounds of the formulae:

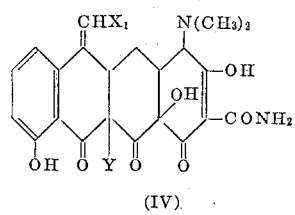

(IV)

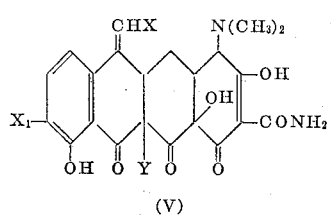

(V)

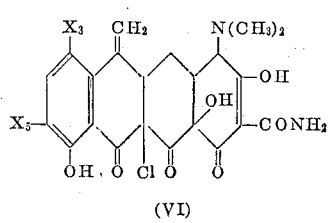

(VI)

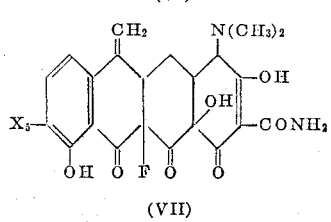

(VII)

in which
X is selected from the group consisting of chloro, bromo and iodo;
$X_1$ is selected from the group consisting of chloro, bromo, iodo and nitro;
$X_3$ is selected from the group cosisting of hydrogen and chloro;
$X_5$ is selected from the group consisting of hydrogen and nitro; and Y is selected from the group consisting of chloro and fluoro.

Compounds of Formulae IV, V, VI and VII are prepared according to the following sequence of reactions:

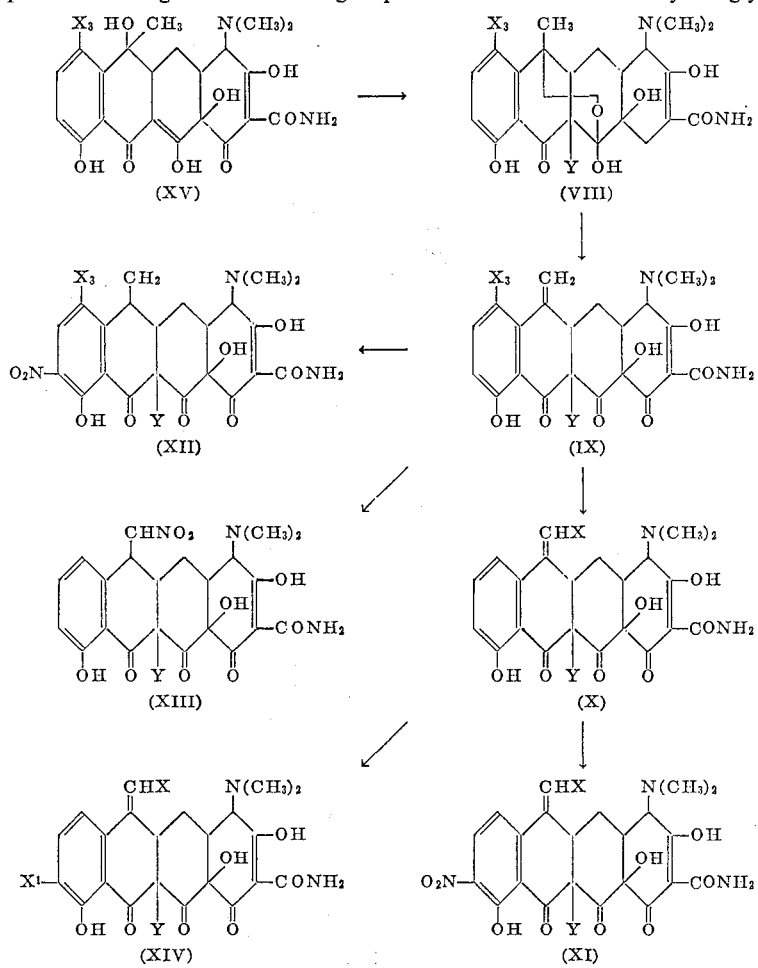

In the above sequence, X and $X^1$ are chloro, iodo or bromo; $X_3$ is hydrogen or chloro; and Y is chloro or fluoro, provided that when $X_3$ is chloro, Y is chloro. The above sequence of reactions may be summarized as follows:

XV→VIII, 11a-halogenation;
VIII→IX, treatment with a strong acid;
IX→X, and X→XIV, halogenation;
X→XI, and IX→XII and XIII, nitration.

The 11a-halogenation reaction is accomplished by merely contacting the selected tetracycline starting compound, preferably in the amphoteric form, with a halogenating in a reaction-inert solvent. For the production of the present new 11a-halotetracyclines in which the halogen is Cl, a variety of halogenating agents may be used, including chlorine, iodochloride, N-chloro-lower alkanoic acid amides, e.g. N-chloroacetamide, hydrocarbon dicarboxylic acid imides, e.g. N-chlorosuccinimide, phthalimide and the like, N-lower-alkanoyl anilides; 3-chloro, 3-bromo, and 3,5-dichloro-5,5-dimethylhydantoin, perchloride hydrohalides, e.g. pyridinium perchloride hydrochloride, and lower alkyl hypochlorites e.g. 3° butylhypochlorite. It is obvious that, in general, any chlorinating agent commonly employed in the art is operable, but the above are preferred.

By "reaction-inert solvent" as employed herein is meant a solvent which, under the conditions of the reaction, does not react in an undesired manner with either starting compounds or final products. A minimum of laboratory experimentation will permit the selection of suitable solvents for the present process. Exemplary of such solvents are dioxane, tetrahydrofuran, acetone, the dimethyl ether of diethylene glycol (diglyme) and the dimethyl ether of ethylene glycol (monoglyme). Temperature does not appear to be critical in this process, temperatures from −25° to 50° C. being found suitable. Temperatures above 50° C. should preferably be avoided, due to the possible formation of 5a,6-anhydro compounds and other degradation products, with consequent reduction in yield. The selection of the best reaction conditions, e.g. temperature, solvent, halogenating agent, etc., is a matter of routine experimentation.

The 11a-chlorotetracycline hemi-ketals are preferably prepared using a water-miscible solvent system and the products obtained by water dilution of the reaction mixture. Once formed, they are found to be relatively stable in acidic aqueous solutions. For example, 11a-chlorotetracycline-6,12-hemi-ketal hydrochloride on standing in water at pH of about 1 for 18 hours at room temperature shows no detectable decomposition.

The preparation of 11a-fluorotetracycline hemi-ketals is accomplished by contacting tetracycline compounds with perchloryl fluoride in the presence of a base, preferably an alkali metal hydroxide or alkoxide. The reaction is usually carried out by dissolving the starting compound in the selected solvent containing at least a molar equivalent of the base and adding perchloryl fluoride, a gas at room temperature, in the usual fashion. As the reaction proceeds, the pH of the solution drops from alkaline to near neutral values, the product usually commencing to separate at a pH of approximately 8. The crystalline product is collected in the usual fashion and dried.

The preparation of the 11a-halo-6-methylenetetracyclines may be accomplished by treating the starting compound with perchloric acid or liquid hydrogen fluoride. It is preferred to employ aqueous perchloric acid at a concentration of 60–70%. Optimum reaction conditions are readily determined by routine experimentation. In carrying out this process, the starting compound is added to the selected acid and, in general, allowed to react for relatively short periods of time. For example, the starting compound is added to liquid hydrogen fluoride at 0° to 50° C. and allowed to stand for time periods of as little as 5 to 7 minutes and up to several hours, after which the hydrogen fluoride is allowed to evaporate. The residue is then treated by standard procedures to obtain crystalline product as the hydrofluoride salt, e.g. stirred in a non-solvent and recrystallized from a solvent such as a lower alkanol. When the starting compound for this process is an 11a-fluoro compound, excellent results are obtained using perchloric acid. When perchloric acid is used with the 11a-fluoro compounds, the reaction is preferably carried out at temperatures about 50° C. and higher, preferably from about 60° C. to 70° C. More highly concentrated perchloric acid may be used in the process but its use is not preferred because of the explosion hazard with which those skilled in the art are familiar. The reaction time does not appear to be critical since the reaction appears to be almost instantaneous. For example, a reaction time of from 5 to 15 minutes is usually found to give excellent results when the reaction temperature is in the range of 60–70° C. At lower temperatures, slightly longer reaction periods may be required to obtain substantial yield of the product.

After the reaction is complete, the product is obtained by standard procedures. For example, it is most convenient to merely dilute the reaction mixture with non-solvent, e.g. water, ether and the like, which results in precipitation of the product as the salt corresponding to the acid used. The products may be converted to the free base or any desired salt in the usual manner.

Nitration is accomplished by any of the standard methods used for this purpose. For example, the starting compound is reacted with nitric acid per se or formed in situ, e.g. potassium nitrate in anhydrous hydrofluoric, fluoroacetic or sulfuric acid. The nitration reaction may also be carried out in a solvent, such as a lower alkanoic acid, e.g. acetic acid, although a variety of other solvents, including water, may also be used. A minimum of laboratory experimentation will permit the selection of suitable solvents. While reaction may vary appreciably, the use of high temperatures should be avoided. Satisfactory results are obtained over the range of from about 0° C. to about 80° C., with room temperature preferred as most convenient for most solvents. Reaction time is not overly critical, particularly in view of the stability of the starting compounds to the acid reaction conditions. To ensure best yields it is preferred to use reaction periods of from about 6 to 24 hours. Nitration in strong acid solvents such as trifluoroacetic acid or HF generally occurs on the 6-methylene substituent, although when dilute aqueous nitric acid or nitric acid in aqueous acetic acid is used, the principal product is the 9-nitro compound. The coproduced isomers are separable from the principal products by standard techniques, for example, fractional crystallization, column chromatography and/or countercurrent distribution using known solvent systems.

The direct halogenation is accomplished by merely contacting the starting 11a-halo compound with a halogenating agent in a reaction-inert solvent, preferably a strong acid such as trifluoroacetic acid or anhydrous hydrogen fluoride. A number of halogenating agents may be used for this purpose, including those enumerated hereinbefore as well as corresponding bromo and iodo compounds, such as bromine, N-iodosuccinimide and the like. To obtain mono-halo substitution products, it is usually preferred to use an equimolar amount of halogenating agent i.e. brominating, chlorinating or iodinating agent, although excess amounts up to about 20 mole percent may also be employed. To obtain dihalo compounds, a two molar ratio of halogenating agent is used. Alternatively, the mono-halo compounds may be further halogenated with an equimolar amount of reagent to obtain dihalo compounds. The time of reaction will vary with the starting compound and the selected halogenating agent. Generally, the reaction is allowed to proceed until a negative starch-iodide test is obtained. Reaction temperatures ranging from −25° up to about 100° C. may be used, although it is usually preferred to employ temperatures ranging between 20 and 40° C. for reaction in trifluoroacetic acid, and 0–20° C. in liquid HF. When the reaction is complete, the product is obtained by any of the standard methods of isolation, which include, for example, precipitation by concentration of the reaction mixture or by dilution with a non-solvent, e.g. ether, hexane. The product as obtained may be further purified or utilized in crude form for the 11a-dehalogenation reaction hereinafter described.

Halogenation principally yields 6-halomethylene compounds and small amounts of the 7 and/or 9-halo compounds. Dihalogenation gives substitution on the exomethylene and at predominately the 9-position. The coproduced isomers are separable from the principal products by standard techniques, for example, fractional crystallization, column chromatography and/or countercurrent distribution using known solvent systems.

The 11a-dechlorination is accomplished by either chemical or catalytic reduction using procedures well known to those in the art. Catalytic reduction may be accomplished in a solvent for the starting compound in the presence of a noble metal catalyst and at pressures of hydrogen gas ranging from atmospheric to superatmospheric. Temperatures of from 0° to about 50° C., and usually room temperature, are preferred, and generally give best results. The noble metal catalyst, e.g. palladium or rhodium, is advantageously employed on a support such as carbon, a commonly available form. The hydrogenation is carried out until an equimolar amount of hydrogen gas is absorbed, at which point the hydrogenation is stopped. When the starting compound contains reducible groups other than 11a-halogen, e.g. 7 or 9-halogen, milder conditions of temperature and pressure should be used, particularly when palladium is used as catalyst. The solvent selected for the hydrogenation should, of course, be reaction-inert, and a variety of organic solvents may be used for this purpose; minimum laboratory experimentation will permit the selection of a suitable solvent for any specific starting compound. Generally, lower alkanols, e.g. methanol, ethanol, are found most suitable, although a variety of other solvents may be used.

A variety of chemical reducing agents may be used for the present 11a-dechlorination reaction. These include reduction with active metals such as zinc, or with active metals in mineral acids, e.g. zinc or iron in dilute hydrochloric acid; reduction with alkali metal hydrosulfite, preferably sodium hydrosulfite, which is commercially available, in aqueous media; and reaction with sodium iodide in a halogen-acceptor solvent such as acetone or methanol, preferably in the presence of zinc metal. When aqueous systems are used in the aforementioned chemical reductions, it is at times desirable to utilize a water-miscible solvent, particularly when the starting compound is of limited solubility in the reaction mixture. The water-miscible solvent does not alter the course of the reduction, but merely provides for more efficient reduction, e.g. shorter reaction time, by providing more intimate contact of the reagents. A large number of such solvents are available and include, among others, dimethylformamide, dimethoxyethane, methanol, ethanol, acetone, dioxane, tetrahydrofuran and the like. When the compound to be 11a-dechlorinated contains a nitro group, reduction with sodium iodide in acetone is a preferred method if the nitro group is to be retained. On the other hand, if the corresponding 9-amino-11a-deshalo product is desired, catalytic hydrogenation, with consumption of four equivalents of hydrogen, may be employed.

In general, defluorination of the 11a-fluoro derivatives by catalytic hydrogenation is accompanied by prior or simultaneous reduction of the exocyclic double bond; these derivatives are therefore valuable intermediates for the preparation of 6-deoxytetracyclines. However, 11a-defluorination can be achieved with retention of the exocyclic double bond, by chemical reduction with hydrosulfite or metal combinations, as previously discussed. 9-nitro groups, were present, are reduced to amino in these procedures.

The products are obtained from the 11a-dehalogenation reaction mixtures by standard procedures. For example, the present new compounds are isolated from the catalytic hydrogenation reaction mixtures, after filtration of the catalyst, by precipitation, e.g. with a non-solvent such as ether or hexane, or concentrations, usually under reduced pressure, or a combination of these. Work-up of the chemical reduction mixtures to obtain the reduction product may also be accomplished by known procedures, such as precipitation, concentration, solvent extraction, e.g. with alcohols such as the butanols and pentanols, or combinations of these procedures.

The reduction products, after isolation, may be purified by any of the generally known methods for purification of tetracycline. These include recrystallization from various solvents and mixed solvent systems, chromatographic techniques and counter-current distribution, all of which are usually employed for this purpose.

The following table summarizes the activity of 6-methylenetetracyclines against a variety of disease-causing microorganisms including antibiotic-resistant strains. The minimum inhibitory concentration (MIC) is determined by the well-known serial-dilution technique. Included in the table are the MIC's of the 11a-chloro-6-methylenetetracycline, 6-methylenetetracycline and 6-deoxytetracycline. It is noted that the MIC values for 6-methylenetetracycline are generally lower than those for 6-deoxytetracycline, indicating greater activity, especially against *Micrococcus pyogenes* var. *aureus* 400, a tetracycline-resistant organism.

*Table I*

1. 6-methylenetetracycline
2. 6-deoxytetracycline
3. 11a-chloro-6-methylenetetracycline

| Organism | MIC (mcg./ml.) | | |
|---|---|---|---|
| | 1 | 2 | 3 |
| *Micrococcus pyogenes* var. *aureus* | 0.19 | 0.78 | 50 (25 p) |
| *Streptococcus pyogenes* | 0.19 | 0.39 | 12.5 |
| *Streptococcus faecalis* | 0.19 | 0.78 | 25 |
| *Diplococcus pneumoniae* | 0.19 | 3.12 | 25 |
| *Erysipelothrix rhusiopathiae* | 0.19 | 0.39 | |
| *Corynebacterium diphtheriae* | 0.78 | 3.12 | 100 |
| *Listeria monocytogenes* | 0.19 | 6.25 | 25 |
| *Bacillus subtilis* | 0.19 | 0.01 | 3.12 |
| *Lactobacillus casei* | 0.78 | 25 | 100 (50 p) |
| *Bacterium ammoniagenes* | 0.19 | 0.78 | 12.5 |
| *Aerobacter aerogenes* | 3.12 | 6.3 | 100 |
| *Escherichia coli* | 1.56 | 6.3 | 100 |
| *Proteus vulgaris* | 12.5 | 100 | 100 |
| *Pseudomonas aeruginosa* | 25.0 | 100 | 100 |
| *Salmonella gallinarum* | 3.12 | 12.5 | 100 |
| *Salmonella pullorum* | 0.78 | 3.12 | 100 (p) |
| *Klebsiella pneumoniae* | 1.56 | 6.3 | 100 |
| *Neisseria gonorrhoeae* | 0.19 | 0.78 | 12.5 |
| *Hemophilus influenzae* | 0.19 | 0.09 | 6.25 |
| *Shigella sonnei* | 3.12 | 3.12 | |
| *Brucella bronchiseptica* | 0.19 | 0.19 | 6.25 |
| *Malleomyces mallei* | 0.39 | 3.12 | 25 |
| *Vibrio comma* | 0.19 | 0.19 | 6.25 |
| *Pasteurella multocida* | 0.19 | 0.39 | 25 |
| *Streptococcus agalactiae* | 0.19 | | 12.5 |
| *Mycobacterium 607* | 0.19 | 0.19 | 0.78 |
| *Mycobacterium berolinense* | 0.19 | 100 | 0.39 |
| *Candida albicans* | 50 | 100 | 100 |
| *Sarcina lutea* | 0.19 | | 100 |
| Antibiotic resistant strains of *Micrococcus pyogenes* var. *aureus*: | | | |
| 376 [1] | 6.25 | 6.3 | 100 |
| 400 [2] | 0.78 | 3.12 | 50 |

[1] Resistant to tetracycline at a concentration below 100 mcg./mg.
[2] Resistant to tetracycline at a concentration below 50 mcg./mg.
(p) Partial inhibition.

When in vitro tests were repeated in the presence of human serum, similar results are observed. For example, 6-methylenetetracycline in 20% human serum when tested against *Micrococcus pyogenes* var. *aureus* showed an MIC value of 0.78; against *Streptococcus pyogenes*, 0.39. When 11a-chloro-6-methylenetetracycline was tested in vivo through both the oral and parenteral routes in mice, it showed activity comparable to tetracycline against infection produced with tetracycline-sensitive microorganisms. The $PD_{50}$ (PD=protective dose) for 11a-chloro-6-methylenetetracycline against an infection produced with *Micrococcus pyogenes* var. *aureus* is 5.5 mg./kg. (orally) and 1 mg./kg. (parenterally). Similar results are observed using 6-methylenetetracycline.

The present new 6-methylene compounds may be formulated into various compositions analogous to the parent tetracyclines from which they are derived. They are also useful therapeutically in feeds or as growth stimulants, in veterinary practice, and in agriculture. Prolonged oral and parenteral treatment of test animals with several of the new 6-methylenetetracyclines of the present invention has resulted in thyroid pigmentation. Until these compounds have been clinically evaluated, it is impossible to state whether the same manifestations will be associated with prolonged treatment of man and whether or not any such manifestations will be reversible. In any case, these compounds will be useful for the oral or parenteral treatment of acute infections which can be quickly cured, as well as for topical application purposes.

As will be apparent to those skilled in the art, the 6-methylene tetracyclines and the 11a-halo-6-methylene tetracyclines may be partially converted to their C-4 epimers under many conditions, particularly at pH's between 2 and 6 and in such solvents as glacial acetic acid. In practice, 6-methylene tetracycline and 11a-halo-6-methylene tetracycline as isolated by the procedures described herein may contain small amounts, i.e. less than 20%, of their C-4 epimers. 5-Hydroxy-6-methylene tetracyclines are more resistant to C-4 epimerization. The C-4 epimers of the compounds of this invention may be isolated from mixtures using standard procedures such as paper chromatography or countercurrent distribution techniques. The essentially pure C-4 epi-compounds may be reconverted to the normal, more active form by procedures well known to the art, for example, by treatment with glacial acetic acid.

Like the other new 6-methylenetetracyclines of this invention, 6-deoxy-6-demethyl-6-nitromethylenetetracycline and the corresponding 11a-halo compounds exhibit in vitro activity against a variety of microorganisms. In addition, they are useful intermediates for other antimicrobial agents; under conditions which remove the 11a-halogen and reduce the nitro to an amino group, the resulting unstable 6-deoxy-6-demethyl-6-aminomethylenetetracycline readily hydrolyzes to form 6-deoxy-6-demethyl-6-formyltetracycline, and this substance may be further subjected to the numerous transformations characteristic of the formyl group, to produce additional products.

The new 9-amino-6-methylene- and -6-halomethylene tetracyclines, and the corresponding 11a-fluoro compounds, may also be converted to other valuable antimicrobial agents, including 9-formamido-6-methylenetetracycline, by standard acylation. The amino groups are transformed, for example, to the corresponding 9-formamido or acetamido derivatives by room temperature treatment with acylating agents such as acetoformic anhydride or acetic anhydride, respectively. The same reactions may also be applied to the hereinafter described derivatives of the 6-methylene and 6-halomethylenetetracyclines, including the anhydrotetracyclines, dehydrotetracyclines and tetracyclines possessing a 9-amino group.

In addition to their use as antibacterial agents, the present new compounds of Formulae I, II and III are useful for the syntheses of a variety of tetracyclines by conversion to corresponding 5a,6-anhydrotetracycline compounds, oxygenation of said compounds to produce corresponding dehydro compounds, which, on reduction, are converted to tetracycline compounds which differ from the starting 6-methylene compounds by virtue of the hydroxy and other substituents at the 6-position of the tetracycline nucleus.

The conversion to 5a,6-anhydrotetracyclines produces new compounds represented by the formulae:

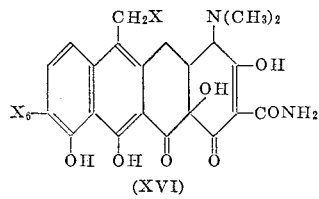

(XVI)

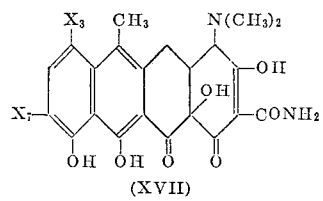

(XVII)

in which

X is selected from the group consisting of chloro, bromo and iodo;

$X_3$ is selected from the group consisting of hydrogen and chloro;

$X_6$ is selected from the group consisting of hydrogen, chloro, bromo, iodo, nitro and amino; and $X_7$ is selected from the group consisting of nitro and amino.

The conversion to anhydro compound is accomplished by treatment of the starting 6-methylenetetracycline with an acid. A number of acids may be used for this purpose. Mineral acids are found to be particularly suitable, for example, 85% aqueous sulfuric acid, or hydrochloric, hydrofluoric, phosphoric, perchloric acids, hydrogen chloride, hydrogen fluoride, and the like. Generally, it is sufficient to merely contact the starting compound with the acid at from room temperature to about 100° C. and merely allow the reaction to proceed to completion. The course of the reaction may be readily followed by paper chromatographic analysis of an aliquot of the reaction mixture, which allows for determination of the most efficient reaction periods. The products are obtained by standard procedures of isolation, e.g. concentration and precipitation. The new anhydrotetracyclines have substantial antibacterial activity in vitro. The 6-halomethyl anhydrotetracyclines also undergo standard nucleophilic displacement reactions with a variety of nucleophils, including halides, nitrites, cyanates, thiocyanates, thiosulfates, amines, alkoxides and mercaptides, to yield other antibacterial anhydrotetracyclines substituted at the 6 - methyl group.

The oxygenation process to produce dehydrotetracyclines yields the following new compounds:

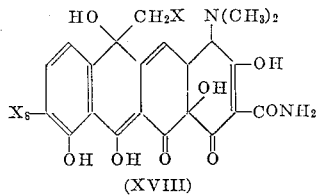

(XVIII)

in which

X is selected from the group consisting of chloro, bromo and iodo; and $X_8$ is selected from the group consisting of hydrogen, chloro, bromo, iodo and amino.

This process is accomplished by microbiological means. The anhydrotetracycline selected is added to a fermentation medium inoculated with an S. aureofaciens strain such as S. aureofaciens ATCC 12748, 12749, 12750, 12751 and 13191, which are obtainable from the American Type Culture Collection, Washington, D.C. The fermentation medium contains the usual nutrients and mineral substances used for the cultivation of strains of S. aureofaciens. The other general conditions of the fermentation, such as pH, temperature, time, aeration, inoculum, sterilization and the like are conventional and may be similar to those for the production of chlortetracycline shown in U.S. Patent 2,482,055.

The product is obtained by conventional procedures; e.g. the broth may be adjusted to pH 1–2 with mineral acid, filtered, and the filtrate adjusted to about pH 8–9 to precipitate the product. Alternatively, the filtered broth may be extracted with solvent, such as butanol. The extract is then concentrated and chromatographed on a diatomaceous earth column in the well known manner and the column developed with 80:20 butanol:chloroform. The effluent extracts are then concentrated and lyophilized. The crude product may then be crystallized from a suitable solvent, e.g. methanol, if desired.

Alternatively, the conversion of the 5a,6-anhydrotetracyclines to the corresponding 5,5a-dehydrotetracyclines may be effected by the photo-oxidation procedure of Scott and Bedford, as described in the Journal of the American Chemical Society, volume 84, pp. 2271–2 (1962). In accordance with this procedure, the anhydrotetracycline is oxidized to the corresponding 6-deoxy-6-hydroperoxy dehydrotetracycline by contacting a solution of the starting compound in a reaction-inert solvent with oxygen or air while irradiating with light of about 300–450 mµ wave length; and subsequently reducing the hydroperoxy compound to the desired dehydrotetracycline, for example by treatment with an aqueous solution of an alkali metal sulfite or hydrosulfite, or by hydrogenation in the presence of a noble metal catalyst such as palladium or rhodium. In the case of catalytic hydrogenation, continued reaction may lead to further reduction of the dehydrotetracycline product, i.e. to the corresponding tetracycline, as well as to removal of a 7-halo substituent where present, particularly when palladium is employed as catalyst. Thus, where it is desired to recover the 5,5a-dehydrotetracycline, the reaction should be halted when the calculated proportion of hydrogen has been consumed.

The reduction of the dehydro compounds produces new tetracycline antibiotics of the following formula:

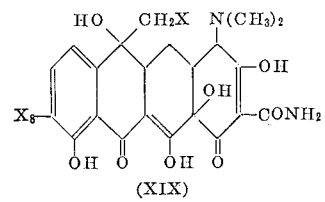

(XIX)

in which

X is selected from the group consisting of chloro, bromo and iodo; and $X_8$ is selected from the group consisting of hydrogen, chloro, bromo, iodo and amino.

Various procedures, including catalytic hydrogenation and microbiological reduction, are effective for reduction. The microbiological reduction is effected by adding the dehydrotetracycline to a fermentation medium inoculated with a conventional chlortetracycline- or tetracycline-synthesizing strain of S. aureofaciens, such as publicly available S. aureofaciens NRRL 2209 (obtainable from the Northern Regional Research Laboratories at Peoria, Illinois), and allowing fermentation to proceed under aerobic conditions. The conditions of the fermentation may be the same as the known methods for producing chlortetracycline and tetracycline by fermentation, except for the addition of one of the new dehydrotetracyclines at the beginning of, or during, the fermentation. The media and fermentation conditions set forth above for the preparation of dehydrotetracylines are also suitable here.

As an alternative to microbiological reduction, the conversion of the 5,5a-dehydrotetracyclines of the present invention to the corresponding tetracyclines may be effected by catalytic hydrogenation. The hydrogenation reaction is carried out under conventional conditions. The dehydrotetracycline is dissolved in a reaction-inert solvent and then subjected to treatment with hydrogen gas over a noble metal catalyst, including palladium, platinum, rhodium, and the like. Suitable solvents include dimethyl formamide, dioxane, tetrahydrofuran, monoglyme, diglyme, and the like. If desired, the catalyst may be one which is suspended in an inert carrier, such as palladium on carbon. The hydrogenation may be carried out at atmospheric or superatmosphere pressures of hydrogen gas, i.e. up to several thousand pounds per square inch. It is generally preferred, however, to employ pressures of from about 2 to about 4 atmospheres, since these are found most convenient. The reaction temperature does not appear to be critical. Excellent results are obtained with temperatures up to about 50° C. The use of higher temperatures, though operable, is not recommended, since lower yields of the desired product may result.

After the reaction is complete, as indicated by the absorption of one mole of hydrogen, the product is obtained in the usual manner, e.g. filtration of the catalyst and concentration of the reaction mixtures. The products may be further purified by countercurrent distribution in butanol:0.01 N aqueous HCl. In the case of those dehydrotetracyclines containing a 7- or 9-halo group, hydrogenolysis of the latter may concurrently occur, in which case the hydrogen uptake will be correspondingly greater.

The latter reaction is facilitated by the presence of a base, e.g. triethylamine. However, under mild conditions, and particularly where rhodium on carbon is employed as catalyst, it is possible to hydrogenate at the 5,5a-position without concurrent removal of halo substituents in the D ring.

The new tetracycline compounds so produced are also useful for human therapeutic uses, in agriculture and in veterinary practice.

For human therapy, the usual oral dosage of the present new tetracycline compounds described herein is from about 0.1 to about 2 g. per day for the average adult. The products are formulated into capsules or tablets containing from 25 to 250 mg. of antibiotic on an activity basis. Suspensions or solutions in various vehicles are prepared having concentrations ranging from 5 to 125 mg./ml. For parenteral administration intramuscularly or intravenously, the daily dose is reduced to about 0.2 to 1.0 g. Intramuscular formulations comprise solutions of the antibiotic at concentrations ranging from 50 to 100 mg./ml. Intravenous administration is by means of isotonic solutions having antibiotic concentration of about 10 mg./ml. Both types of parenteral products are conveniently distributed as solid compositions for reconstitution. In all instances, of course, the attending physician will indicate the dosage to fit the needs of a particular patient. For children, smaller doses are generally used.

The present invention embraces all salts, including acid-addition and metal salts, of the newly recognized amphoteric antibiotics. The well-known procedures for preparing salts of tetracycline compounds are applicable here and are illustrated by examples appearing hereinafter. Such salts may be formed with both pharmaceutically acceptable and pharmaceutically unacceptable acids and metals. By "pharmaceutically acceptable" is meant those salt-forming acids and metals which do not substantially increase the toxicity of the amphoteric antimicrobial agent. The preferred salts are the acid addition salts and pharmaceutically acceptable metal salts.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g. p-toluene-sulfonic acids, and the like. The pharmaceutically unacceptable acid addition salts, while not useful for therapy, are valuable for isolation and purification of the newly recognized antibiotics. Further, they are useful for the preparations of pharmaceutically acceptable salts. Of this group, the more common salts include those formed with hydrofluoric and perchloric acids. Hydrofluoride salts are particularly useful for the preparation of the pharmaceutically acceptable salts, e.g. the hydrochloride, by solution in hydrochloric acid and crystallization of the hydrochloride salt formed. The perchloric acid salts are useful for purification and crystallization of the new antibiotics.

Whereas all metal salts may be prepared and are useful for various purposes, the pharmaceutically acceptable metal salts are particularly valuable because of their utility in therapy. The pharmaceutically acceptable metals include more commonly sodium, potassium and alkaline earth metals of atomic number up to and including 20, i.e., magnesium and calcium, and additionally, aluminum, zinc, iron, and manganese, among others. Of course, the metal salts include complex salts, i.e., metal chelates, which are well recognized in the tetracycline art. The pharmaceutically unacceptable metal salts embrace most commonly salts of lithium and of alkaline earth metals of atomic number greater than 20, i.e., barium and strontium, which are useful for isolating and purifying the antibiotic. Since the new antibiotics are amphoteric, they also form salts with amines of sufficient basicity.

It will be obvious that, in addition to their value in therapy, the pharmaceutically acceptable acid and metal salts are also useful in isolation and purification of the present new compounds.

The following examples are given by way of illustration and are not to be construed as limitations of this invention, many variations of which are possible within the scope and spirit thereof.

EXAMPLE 1

*11a-chloro-6-deoxy-6-demethyl-6-methylenetatracycline*

11a - chlorotetracycline - 6,12 - hemi - ketal is dissolved in liquid hydrogen fluoride (in a ratio of 2 g./15 ml.) at 0° C. The mixture is maintained at this temperature for 10–15 minutes, after which the hydrogen fluoride is evaporated off. The residue is triturated in ether to obtain the solid product, 11a - chloro - 6 - deoxy- 6 - demethyl - 6 - methylenetetracycline, as the hydrofluoride salt which is recrystallized from methanol.

Alternatively, the crude hydrofluoride product (10 g.) is dissolved in 350 ml. of $H_2O$ by warming and stirring. An equal volume of conc. HCl is added to the clear solution and the product crystallizes as the hydrochloride salt. Elemental analysis of the hydrochloride salt thus obtained gives the following results.

Calcd. for $C_{22}H_{22}O_7N_2Cl_2$: C, 53.11; H, 4.56; chloride 7.13; N, 5.63. Found: C, 52.62; H, 4.63; chloride 6.84; N, 5.54.

Infrared analysis of the product as the hydrochloride salt in a KBr pellet at 1% concentration shows carbonyl absorption at 5.70 as well as the following significant peaks: 6.1, 6.23, 6.36, 6.45 (shoulder), 6.91, 7.85, 8.14, 8.55, 10.22, 10.55 and 10.89. Bioassay of the product (*K. pneumoniae*) shows an oxytetracycline activity of 50–100 mcg./mg. Ultraviolet analysis of the sample in 0.01 N methanol-HCl shows maxima at 376, 278 and 242 m$\mu$. The product shows an $Rf$ value of from 0.2 to 0.3 in the following system.

Mobile phase: 20:3 toluene-pyridine saturated with pH 4.2 buffer

Immobile phase: pH 4.2 buffer (aqueous)

On analysis of the papergram with ultraviolet light, the product spot does not fluoresce strongly. However, on spraying, with aqueous sodium hydrosulfite, it shows strong fluorescence.

The C–4 epimer of the product, present as a minor impurity, shows $R_f$ 0.1 in this system.

EXAMPLE 2

*11a-fluoro-6-deoxy-6-demethyl-6-methylenetatracycline*

11a - fluorotetracycline - 6,12 - hemi - ketal, 250 mg. is stirred in 2 ml. of 63% aqueous perchloric acid. The solid dissolves on warming to 60°–65° C. for 15 minutes after which the mixture is cooled and water is added to obtain 11a - fluoro - 6 - deoxy - 6 - demethyl - 6 - methylenetetracycline as the chlorate salt. The product shows similar absorption on ultraviolet analysis to that of Example 1.

EXAMPLE 3

The following compounds are prepared from corresponding 11a - halo - tetracycline - 6,12 - hemi - ketals by the procedure of Example 1:

7,11a - dichloro - 6 - deoxy - 6 - demethyl - 6 - methylenetetracycline

7 - bromo - 11a - chloro - 6 - deoxy - 6 - demethyl - 6 - methylenetetracycline

EXAMPLE 4

*Preparation of mineral acid salts*

11a - chloro - 6 - deoxy - 6 - demethyl - 6 - methylenetetracycline hydrofluoride is dissolved in water and the solution adjusted to pH 5. The resulting amphoteric compound which precipitates is filtered and dried. The amphoteric compound is dissolved in methanol containing a molar equivalent of hydrogen chloride and the hydrochloride salt is precipitated by the addition of ether.

This hydrochloride salt is also prepared by the method of Example 1 from the hydrofluoride salt. Other mineral acids may be substituted for hydrochloric acid in this procedure to obtain the salt of choice.

The hydrochloride salt is recrystallized from butanol, butanol-hydrochloric acid, acetone or acetone-hydrochloric acid. The hydrofluoride salt used as starting compound may be recrystallized from methanol, methanol-monoglyme, or methanol and ethylene dichloride.

Using similar procedures, the hydrochloride, hydrobromide, nitrate, sulfate, hydriodide and phosphate salts of the 11a - halo - 6 - methylenetetracyclines of the previous examples are prepared.

Similarly, other salts are formed using a variety of acids, for example, organic carboxylic acids such as tartaric, citric, malic, benzoic, glycellic, gluconic, gulonic, succinic, acetic and the like. The salts formed with pharmaceutically-acceptable acids are useful for therapy; those with pharmaceutically-unacceptable acids are useful in the purification of the new products and in the preparation of pharmaceutically acceptable salts.

EXAMPLE 5

*6-deoxy-6-demethyl-6-methylenetetracycline*

METHOD A

The product of Example 1 (5 mg.) is dissolved in 3 ml. of methanol and a freshly prepared solution of sodium hydrosulfite (20 mg. in 2 ml. of water) is added. The mixture is allowed to stand for 15 minutes at room temperature, after which it is stripped of methanol and extracted with butanol. The butanol extract is concentrated to obtain the product, 6 - deoxy - 6 - demethyl-6 - methylenetetracycline. The product is crystallized from water as the p-toluene-sulfonate salt by addition of p-toluenesulfonic acid. Alternatively, it is crystallized as the hydrochloride salt from water by addition of concentrated HCl.

In a repeat experiment on a larger scale, 500 mg. sodium hydrosulfite is combined with one gram of the substrate in 25 ml. water plus 25 ml. methanol. The reaction mixture is stirred 30 minutes at room temperature and then clarified by filtration. The methanol is evaporated from the filtrate and the residue is extracted with butanol. Evaporation of the extract yields the desired product.

On testing against *K. pneumoniae*, the product has an oxytetracycline activity of at least 1100 mcg./mg. The product shows an $R_f$ value of 0.6 in the same system as described in Example 1, and shows $R_f$ 0.9 in the following system.

Mobile phase: 20:10:3 nitromethane:chloroform:pyridine

Immobile phase: pH 3.5 buffer (aqueous)

The C.4 epimer of this substance shows $R_f$'s of approximately 0.4 and approximately 0.6 in the two systems.

METHOD B

A solution of 50 g. of 11a-chloro-6-deoxy-6-demethyl-6-methylenetetracycline hydrochloride in 500 ml. of monomethyl ether of ethylene glycol is cooled to 4° C. in an ice bath and the rapidly stirred solution is treated with 50 g. of zinc metal dust at a gradual rate over a period of about 10 minutes. The temperature rises to 12° C. during addition. After addition is complete, the temperature begins to fall. After a total reaction time of 15 minutes the zinc is removed by rapid filtration and washed with solvent. One liter of water is added gradually to the filtrate over a period of about 10 minutes. A yellow slurry of the zinc complex of the product is formed. pH of the solution is then adjusted to 6.8 with 10% aqueous sodium hydroxide.

The resulting slurry is digested for about 1.5 hours in an ice bath and filtered. The wet cake is then slurried in 750 ml. of water and conc. HCl is added dropwise until a clear solution is obtained. A slight excess of conc. HCl causes rapid crystallization of 6-deoxy-6-demethyl-6-methylenetetracycline hydrochloride as glistening needles. After digestion for one hour, the product is filtered and dried. The yield of the product is 37.8 g. The product melts at 213.8–214.2° C. with decomposition.

METHOD C 11a-fluoro-6-deoxy - 6-demethyl - 6 - methylenetetracycline, 5 g. in 125 ml. dilute hydrochloric acid (1 part conc. HCl in 55 parts water), is combined with 2 g. zinc dust and stirred one hour at 20° C. The reaction mixture is then filtered and the filtrate extracted with butanol. Evaporation of the butanol extract yields the desired product containing some anhydro compound as impurity.

METHOD D

To one gram of the same starting compound as in Method C in 25 ml. water plus 25 ml. methanol is added 400 mg. sodium hydrosulfite. Stirring is continued for 20 minutes at room temperature. An additional 400 mg. sodium hydrosulfite is then added and stirring continued 20 minutes longer. This step is repeated a second time and the reaction mixture is finally clarified by filtration and stripped of methanol. Butanol extraction of the residue and evaporation of the extract yields the product.

EXAMPLE 6

The procedure of Example 5, Method A, is repeated to dechlorinate the 11a-chloro-6-methylenetetracyclines of the previous examples to provide the following products:

7-bromo-6-deoxy-6-demethyl-6-methylenetetracycline 7-chloro-6-deoxy-6-demethyl-6-methylenetetracycline C–4 epimers occur as impurities.

EXAMPLE 7

The hydrochloride, hydrobromide, sulfates, hydriodide and phosphate salts of the 6-methylenetetracyclines are prepared according to the methods described in Example 4.

EXAMPLE 8

The sodium salt of 6-methylenetetracycline is prepared by dissolving the tetracycline compound in water containing an equivalent amount of sodium hydroxide. The solution is immediately freeze-dried to obtain the sodium salt.

Similarly, other alkali and alkaline earth metal salts of the present new 6-methylene compounds are prepared; including the potassium, lithium, barium, calcium, strontium and magnesium salts. Metal complex formation occurs with polyvalent metals.

EXAMPLE 9

*11a-chloro-6-deoxy-6-demethyl-6-chloromethylenetetracycline*

METHOD A

To a mixture of 1.2 g. of Example 1 product in 15 ml. of trifluoroacetic acid is added 350 mg. of N-chlorosuccinimide and the mixture is heated at 60° C. After about 3 hours, the mixture gives a negative KI/starch test. The cooled mixture is added dropwise to 500 ml. of cold ether with stirring at ice-bath temperature. After stirring for 3 hours, the precipitated product is filtered, twice slurried in ether and dried to obtain 1 g. of product.

The product is dissolved in 300 ml. of hot methanol, filtered to remove a small amount of insoluble material and concentrated to a volume of 100 ml. Then 3 ml. of p-toluenesulfonic acid dissolved in methanol is added and the mixture permitted to stand at room temperature until crystallization is completed. The product is obtained as the p-toluenesulfonate salt by filtering the precipitate, washing with methanol and drying.

Infrared analysis of the product shows a clear sharp curve with a band at 5.69$\mu$.

Ultraviolet analysis in 0.01 N methanolic HCl shows maxima at 245 and 378 m$\mu$.

Elemental analysis gives the following results.

Calcd. for: $C_{29}H_{28}O_{10}N_2Cl_2S$ (as the p-toluenesulfonate salt): C, 52.18; H, 4.2; N, 4.2; Cl, 10.6; S, 4.8. Found: C, 51.8; H, 4.3; N, 4.3; Cl, 10.3; S, 4.8.

The $PD_{50}$ in mice via the parenteral route vs. *Staph. aureus* 5 infection is 20 mg./kg.

METHOD B 1 gram of the product of Example 1 is placed in a polyethylene container maintained in an ice water bath. To this is added 5 ml. of liquid hydrogen fluoride, followed by 330 mg. of N-chlorosuccinimide. The mixture is allowed to stir at ice bath temperature for one hour, and then poured into 10 ml. of methanol containing 1.2 g. paratoluene sulfonic acid. Ether, 25 ml., is slowly added, and the product crystallizes as the pure toluenesulfonate salt. It is recovered by filtration, washed with ether and dried, to yield 950 mg. Alternatively, the HF reaction mixture is poured into isopropanol containing nitric acid and the product isolated as the nitrate salt.

Following the procedures described, 11a-fluoro-6-deoxy-6-demethyl-6-methylenetetracycline is converted to the corresponding 11a - fluoro - chloro-methylene compound.

EXAMPLE 10

*11a-chloro-6-deoxy-6-demethyl-6-bromomethylenetetracycline*

To a mixture of 4.8 g. of the Example 1 product in 40 ml. of trifluoroacetic acid is added a solution of 0.54 ml. of bromine in 10 ml. of acetic acid. The mixture is warmed at 40°–60° C. for one hour and then allowed to stand for 12 hours at room temperature. The crude product is obtained by the same work-up as in the previous example. It is crystallized from methanol as the p-toluenesulfate salt (3.54 g.). Ultraviolet analysis in 0.01 N methanolic HCl shows maxima at 249 and 379 m$\mu$.

In the same way, 11a-fluoro-6-deoxy-6-demethyl-6-methylenetetracycline is converted to the corresponding 11a-fluoro-bromomethylene compound.

EXAMPLE 11

*11a-chloro-9-bromo-6-deoxy-6-demethyl-6-bromomethylenetetracycline*

To a mixture of 280 mg. of the Example 1 product in 5 ml. of trifluoroacetic acid is added 1.05 ml. of a solution of 0.53 ml. of bromine in 10 ml. of acetic acid. A heavy orange precipitate forms in the mixture, which is then stirred and warmed at 60° C. for 2 hours. The mixture is then allowed to stand for 48 hours and the product (287 mg.) then obtained by work-up with ether as previously described. The product is crystallized as the sulfate salt by dissolving in 5 ml. of methanol and adding 6 drops of conc. $H_2SO_4$.

Ultraviolet analysis of the product in 0.01 N methanolic HCl shows maxima at 251 and 384 m$\mu$.

EXAMPLE 12

*9,11a-dichloro-6-deoxy-6-demethyl-6-chloromethylenetetracycline*

This product is prepared according to the procedure of Example 9 by using two molar equivalents of N-chlorosuccinimide.

EXAMPLE 13

*11a-chloro-9-nitro-6-deoxy-6-demethyl-6-methylenetetracycline*

METHOD A

A mixture of 1 g. of the Example 1 product in 20 ml. of 50% aqueous acetic acid containing 1 ml. of conc. $HNO_3$ is allowed to stand for 12 hours, as the product crystallizes as the nitrate salt. The product is collected by filtration, water-washed and dried.

METHOD B

11a - chloro - 6 - demethyl - 6 - deoxy - 6 - methylene-tetracycline hydrochloride, one gram, is suspended with stirring in 40 ml. 5% aqueous nitric acid at 60° C. After 24 hours, an orange solid is recovered by filtration. The wet cake is taken up in 300 ml. hot methanol, treated with activated carbon, filtered and the filtrate concentrated to 20 ml. 5% nitric acid, about 1 ml., is added, and the product allowed to crystallize as the nitrate salt on overnight refrigeration. Yield is 130 mg.

The products of these procedures exhibit ultraviolet absorption maxima in methanol: 0.01 N HCl at 257 and 371 m$\mu$; and in methanol: 0.01 N NaOH at 254 and 460 m$\mu$.

The following additional nitro compounds are prepared from the corresponding products having hydrogen at the 9 position by the foregoing methods:

7,11a-dichloro-9-nitro-6-demethyl-6-deoxy-6-methylenetetracycline
11a-chloro-9-nitro-6-demethyl-6-deoxy-6-chloromethylenetetracycline
11a-chloro-9-nitro-6-demethyl-6-deoxy-6-bromomethylenetetracycline
11a-chloro-7-bromo-9-nitro-6-deoxy-6-demethyl-6-methylenetetracycline
11a-fluoro-9-nitro-6-deoxy-6-demethyl-6-methylenetetracycline
11a-fluoro-9-nitro-6-demethyl-6-deoxy-6-chloromethylenetetracycline
11a-fluoro-9-nitro-6-demethyl-6-deoxy-6-bromomethylenetetracycline

EXAMPLE 14

*11a-chloro-6-deoxy-6-demethyl-6-nitro-methylenetetracycline*

One gram of the Example 1 product is stirred in 5 ml. trifluoroacetic acid containing 0.15 ml. 70% nitric acid. The resulting solution is allowed to stand for about 24 hours and then poured into 200 ml. ether to precipitate about 1.1 g. of the desired product, which is collected by filtration and dried.

EXAMPLE 15

*11a-chloro-9-nitro-6-deoxy-6-demethyl-6-chloromethylenetetracycline*

This product is obtained from that of Example 13 by the chlorination procedure of Example 9, Method A.

EXAMPLE 16

*6-deoxy-6-demethyl-6-chloromethylenetetracycline*

METHOD A

To 1 mmole of the Example 9 product in 25 ml. of methanol is added 100 mg. of 5% rhodium on carbon. The mixture is hydrogenated with shaking at room temperature and one atmosphere of hydrogen gas until 1 mmole of hydrogen is taken up. After filtering off the catalyst, the solution is evaporated to dryness under reduced pressure. The residue is slurried in ether, filtered and dried to obtain the product.

METHOD B

The product of Example 9, 6.7 g. as the p-toluene sulfonate salt, is stirred in 400 ml. of 50% methanol-water at room temperature. 1.34 g. of sodium hydrosulfite is added to the slurry, and stirring is continued for 45 minutes. A second 1.34 g. portion of sodium hydrosulfite is then added, and stirring continued for another 45 minutes. Insoluble material (0.57 g.) is removed by filtration.

The filtrate is stripped under vacuum to remove the methanol, leaving a yellow-orange slurry. The slurry is extracted with several portions of butanol, and the butanol extracts are combined and evaporated to dryness under vacuum to yield the crude product. Ether is added, and the mixture is stirred and then filtered to obtain 3.4 g. of final product.

Using these procedures, the following compounds are prepared from the corresponding 11a-halo compounds:

6-deoxy-6-demethyl-6-bromomethylenetetracycline
9-bromo-6-deoxy-6-demethyl-6-bromomethylenetetracycline
9-chloro-6-deoxy-6-demethyl-6-chloromethylenetetracycline
6-deoxy-6-demethyl-6-iodomethylenetetracycline
7-chloro-6-methylenetetracycline
7-bromo-6-methylenetetracycline
9-bromo-6-demethyl-6-deoxy-6-chloromethylenetetracycline

EXAMPLE 17

*9-nitro-6-demethyl-6-deoxy-6-methylenetetracycline*

11a - chloro - 9 - nitro - 6 - demethyl - 6 - deoxy - 6 - methylenetetracycline, 5 g. as the nitrate salt (prepared as in Example 13), is stirred with 10 g. sodium iodide in 200 ml. acetone for about 5 minutes, and then filtered to clarify. The product precipitates from the filtrate upon standing overnight and is recovered by filtration and dried. 4.0 g. of product are obtained, containing some of the corresponding 5a,6-anhydro compound as a minor impurity. An ultraviolet absorption maximum is observed at about 368 m$\mu$.

Application of the foregoing procedure to the other 11a-chloro products of Example 13 produces the following compounds:

7-chloro-9-nitro-6-demethyl-6-deoxy-6-methylenetetracycline
9-nitro-6-demethyl-6-deoxy-6-chloromethylenetetracycline
9-nitro-6-demethyl-6-deoxy-6-bromomethylenetetracycline
7-bromo-9-nitro-6-deoxy-6-demethyl-6-methylenetetracycline 6-deoxy-6-demethyl-6-nitromethylenetetracycline is prepared by treatment of the corresponding 11a-chloro compound overnight at room temperature with sodium iodide in acetone in the proportions given above. The reaction mixture is then evaporated to dryness under vacuum, the residue distributed between butanol and water, and the butanol layer evaporated to provide the product.

EXAMPLE 18

*9-amino-6-deoxy-6-demethyl-6-methylenetetracycline*

METHOD A

To 1 mmole of the Example 13 product in 25 ml. of methanol is added 100 mg. of 5% rhodium on carbon. The mixture is hydrogenated with shaking at room temperature and one atmosphere of hydrogen gas until 4 equivalents of hydrogen are taken up. After filtering off the catalyst, the solution is evaporated to dryness under reduced pressure. The residue is slurried in ether, filtered and dried to obtain the product.

The same product is obtained from 9-nitro-6-methylenetetracycline at correspondingly lower hydrogen uptake.

Using this procedure, the following compounds are prepared from the corresponding 11a-chloro compounds of Example 13.

7-chloro-9-amino-6-demethyl-6-deoxy-6-methylenetetracycline
9-amino-6-demethyl-6-deoxy-6-chloromethylenetetracycline
9-amino-6-demethyl-6-deoxy-6-bromomethylenetetracycline
7-bromo-9-amino-6-deoxy-6-demethyl-6-methylenetetracycline

METHOD B

The title product is also obtained from 9-nitro-6-methylenetetracycline and the corresponding 11a-chloro and 11a-fluoro derivatives by the hydrosulfite procedure of Example 5, Method D.

METHOD C

The title product is also obtained from 11a-fluoro-9-nitro-6-methylenetetracycline by the zinc reduction of Example 5, Method C.

EXAMPLE 19

*9-amino-6-deoxy-6-demethyl-6-chloromethylenetetracycline*

METHOD A 11a-fluoro-9-nitro-6-chloromethylenetetracycline, 1 g., is combined with 15 ml. 5% hydrochloric acid and 4.2 equivalents stannous chloride. After stirring for one hour at room temperature, the reaction mixture is butanol-extracted and the product recovered by evaporation of the extract. The same product is obtained from the corresponding 11a-chloro starting compound by this procedure.

METHOD B

The same starting compound yields the title product by the hydrosulfite procedure of Example 5, Method D.

METHOD C

The same starting compound yields the title product by the zinc reduction of Example 5, Method C, with the substitution of 1:7 conc. HCl:water for the 1:55 acid of that earlier example.

19

9-amino-6-deoxy-6-demethyl - 6 - bromomethylenetetracycline is also obtained by these procedures from the corresponding starting compound.

EXAMPLE 20

*6-demethyl-6-chloromethyl-5a,6-anhydrotetracycline*

METHOD A

Three grams of the Example 16 product is dissolved in 15 ml. of dry, liquid hydrogen fluoride and the mixture heated for 48 hours at 75° C. in a stainless steel bomb. The mixture is then evaporated to dryness under nitrogen and the residue triturated with ether, filtered, washed with ether and dried.

METHOD B 1 g. of the same starting compound as in Method A is heated at reflux temperature for 24 hours in a mixture of 10 ml. acetone and 10 ml. dimethylformamide. The reaction mixture is then taken to dryness on a rotating evaporater under high vacuum to obtain the product.

METHOD C

A mixture of 1.5 g. of the same starting compound in 25 ml. 5% hydrochloric acid is combined with 3 ml. of a solution of 12 g. iodine and 8.5 g. potassium iodide in 25 ml. water. The reaction mixture is stirred overnight at room temperature, and an equivalent proportion of sodium thiosulfate is then added to destroy the iodine. The product is recovered by butanol extraction followed by evaporation of the combined extracts under vacuum.

METHOD D 1 g. of the same starting compound in 20 ml. 20% hydrochloric acid is subjected to one atmosphere hydrogen pressure for 2 hours at room temperature in the presence of 200 mg. 5% palladium on carbon. The reaction mixture is then filtered and the filtrate diluted with water. The product is recovered from the diluted filtrate by butanol extraction, followed by evaporation of the combined extracts under vacuum.

Using these procedures, the following compounds are prepared from corresponding starting compounds:

6-demethyl-6-bromomethyl-5a,6-anhydrotetracycline
9-bromo-6-demethyl-6-bromomethyl-5a,6-anhydrotetracycline
9-chloro-6-demethyl-6-chloromethyl-5a,6-anhydrotetracycline
9-nitro-5a,6-anhydrotetracycline
9-nitro-6-demethyl-6-chloromethyl-5a,6-anhydrotetracycline
9-nitro-6-demethyl-6-bromomethyl-5a,6-anhydrotetracycline
9-amino-5a,6-anhydrotetracycline
9-amino-6-demethyl-6-chloromethyl-5a,6-anhydrotetracycline
9-amino-6-demethyl-6-bromomethyl-5a,6-anhydrotetracycline
7-chloro-9-amino-5a,6-anhydrotetracycline
7-chloro-9-nitro-5a,6-anhydrotetracycline The above enumerated amino compounds are also prepared from the corresponding nitro anhydro compounds by reduction, e.g. by catalytic reduction over rhodium by the method previously described.

9-nitro-5a,6-anhydrotetracycline is also prepared from 9-nitro-6-demethyl-6-deoxy-6-methylenetetracycline in the following manner: 500 mg. of the product of Example 17 is dissolved in 20 ml. methanol by warming, and 600 mg. 2-naphthalene sulfonic acid is added. The reaction mixture is permitted to stand at room temperature for 60 hours and then is clarified by filtration. 10 ml. isopropanol is next added, and the mixture is heated to boiling for 5 minutes. 200 mg. of the desired product in the form of the naphthalene sulfonate salt crystallizes from the reaction mixture upon cooling to room temperature, and an additional 190 mg. is obtained from the mother liquor in two succeeding crops.

EXAMPLE 21

*6-demethyl-6-chloromethyl-5,5a-dehydrotetracycline*

METHOD A

A sterile water suspension containing 60–80 million spores per ml. of *S. aureofaciens* ATCC 12,748 is employed to inoculate 24 volumes of a sterile tap water medium containing the following ingredients per liter.

| | |
|---|---|
| Sucrose, g. | 30 |
| Ammonium sulfate, g. | 2 |
| Calcium carbonate, g. | 7 |
| Cornsteep liquor, ml. | 16.5 |

The inoculated medium is incubated for 24 hours at 28° C. with shaking.

This inoculum is introduced into 25 times its volume of sterile water medium containing the following ingredients per liter.

| | Grams |
|---|---|
| Ammonium sulfate | 5 |
| Calcium carbonate | 9 |
| Ammonium chloride | 1.5 |
| Magnesium chloride hexahydrate | 2 |
| Ferrous sulfate heptahydrate | 12 |
| Manganese sulfate tetrahydrate | 10 |
| Cobalt chloride hexahydrate | 1 |
| Zinc sulfate heptahydrate | 20 |
| Cornsteep liquor | 25 |
| Starch | 55 |

The inoculated medium is incubated at 25° C. on a rotary shaker for 48 hours. At this point, 6-deoxy-6-demethyl-6-chloromethyl-5a,6-anhydrotetracycline is added to the broth under sterile conditions at a concentration of 0.5 g./l. and the fermentation is allowed to proceed for an additional 72 hours under aerating conditions.

The fermentation is then halted and the product recovered by adjusting the pH of the broth to 1.5 with conc. HCl and filtering. The filter cake is washed wih dilute acid, the combined filtrate and washings are treated with sodium chloride (54 g. per 200 ml. of filtrate) and extracted with n-butanol. The combined butanol extracts are concentrated to about one-tenth of the original volume, saturated with water and filtered. The filtrate is passed onto a column of diatomaceous earth (Johns-Manville Celite) containing 0.5 ml. of water (adjusted to pH 2 with HCl) per gram of Celite. The column is then developed with butanol-chloroform saturated with 0.01 N HCl to obtain the product in the major fractions which are concentrated to obtain the product.

METHOD B

A 0.1% w./v. solution in toluene of the anhydrotetracycline starting compound of Method A is exposed to light of 300–450 m$\mu$ wave length at room temperature while oxygen is introduced beneath the surface at a rate of 0.25 volume per unit volume solution per minute. When paper chromatography of a sample demonstrates substantial disappearance of the starting compound the reaction mixture is evaporated, and 6-deoxy-6-demethyl-6-hydroperoxy-6-chloromethyl dehydrotetracycline is recovered in good yield.

A 1% w./v. solution of this intermediate in chloroform is shaken with 2 volumes of 10% w./v. sodium hydrosulfite, and the chloroform phase is evaporated to recover the desired dehydrotetracycline product.

Using the procedures of this example, the following compounds are prepared from the corresponding products of Example 20:

6-demethyl-6-bromoethyl-5,5a-dehydrotetracycline
9-bromo-6-demethyl-6-bromomethyl-5,5a-dehydrotetracycline
9-chloro-6-demethyl-6-chloromethyl-5,5a-dehydrotetracycline
9-amino-5,5a-dehydrotetracycline
9-amino-6-demethyl-6-chloromethyl-5,5a-dehydrotetracycline
9-amino-6-demethyl-6-bromomethyl-5,5a-dehydrotetracycline

EXAMPLE 22

*6-demethyl-6-chloromethyltetracycline*

A sterile aqueous fermentation medium containing the following ingredients per liter is inoculated with *S. aureofaciens* NRRL 2209:

| | |
|---|---|
| Calcium carbonate, g. | 9 |
| Ammonium sulfate, g. | 5.6 |
| Manganese sulfate, mg. | 80 |
| Cobalt chloride hexahydrate, mg. | 5 |
| Ammonium chloride, g. | 1.7 |
| Starch, g. | 55 |
| Cornsteep liquor, g. | 25 |
| Lard oil, ml. | 32 |

To this mixture is added 6-demethyl-6-deoxy-6-chloromethyl-5,5a-dehydrotetracycline at a concentration of 0.5 g./l. and fermentation is carried out at 25° C. with agitation for 120 hours. The product is obtained by separation and purification using standard procedures, e.g. as previously described.

Using this procedure, the following compounds are prepared from corresponding 5,5a-dehydro compounds:

6-demethyl-6-bromomethyltetracycline
9-bromo-6-demethyl-6-bromomethyltetracycline
9-chloro-6-demethyl-6-chloromethyltetracycline
9-aminotetracycline
9-amino-6-demethyl-6-chloromethyltetracycline
9-amino-6-demethyl-6-bromomethyltetracycline

EXAMPLE 23

*Catalytic reduction of dehydro compounds*

6-demethyl-6-chloromethyl-5,5a-dehydrotetracycline is hydrogenated in dimethylformamide over 5% rhodium on carbon at room temperature and 50 p.s.i. hydrogen gas until 1 molar equivalent of hydrogen is taken up. The product, 6-demethyl-6-chloromethyltetracycline is obtained by filtering off the catalyst and concentrating the reaction mixture.

Using these procedures the remaining products of the previous example are obtained from corresponding dehydro compounds.

In those cases where halogen is present, the reduction is permitted to continue until a further equivalent amount of hydrogen is taken up to obtain the corresponding deshalo compound. This catalytic hydrogenation procedure is repeated using palladium on carbon as the catalyst with similar results.

EXAMPLE 24

*Acid addition salts*

Amphoteric 6-demethyl-6-chloromethyltetracycline is dissolved in methanol containing an equimolar amount of hydrogen chloride. The hydrochloride salt is then precipitated by addition of ether, and is collected by filtration and dried. The hydrochloride may be recrystallized from butanol, butanol-hydrochloric acid, acetone, acetone-hydrochloric acid or methanol-hydrochloric acid.

In the same manner, acid addition salts are prepared using, in lieu of hydrochloric acid, sulfuric, nitric, perchloric, hydrobromic, phosphoric, hydrofluoric, p-toluenesulfonic, hydriodic, tartaric, acetic, citric, malic, benzoic, glycollic, gulonic, gluconic and succinic acids.

EXAMPLE 25

*Metal salts*

The sodium salt of 6-demethyl-6-chloromethyltetracycline is prepared by dissolving the amphoteric substance in water containing an equimolar amount of sodium hydroxide and freeze drying the resulting mixture.

In this fashion, other metal salts are prepared including potassium, calcium, barium, lithium and strontium salts.

The metal salt complexes of the present new tetracyclines are prepared by dissolving them in a lower aliphatic alcohol, preferably methanol, and treating with an equimolar amount of the selected metal salt, preferably dissolved in the selected alcohol. The complexes are isolated in some instances by simple filtration, but often, since many of them are alcohol soluble, by evaporation of the solvent or addition of a non-solvent such as diethyl ether.

In this fashion, metal salt complexes of the present new tetracyclines consisting primarily of compounds containing a 1:1 ratio of metal to tetracycline are prepared employing the following metal salts: calcium chloride, cobalt chloride, magnesium sulfate, magnesium chloride, stannous chloride, zinc chloride, cadmium chloride, barium chloride, silver nitrate, stannous nitrate, strontium nitrate, magnesium acetate, manganous acetate, palladium chloride, manganous chloride, cerium chloride, titanium chloride, platinum chloride, vanadium chloride, plumbous acetate, stannous bromide, zinc sulfate, chromous chloride and nickelous chloride.

EXAMPLE 26

A suspension of 6-demethyl-6-chloromethyltetracycline is prepared with the following compositions:

| | |
|---|---|
| Antibiotic, g. | 31.42 |
| 70% aqueous sorbitol, g. | 714.29 |
| Glycerine, U.S.P., g. | 187.35 |
| Gum acacia (10% solution), ml. | 100 |
| Polyvinyl pyrrolidone, g. | 0.5 |
| Butyl parahydroxybenzoate (preservative), g. | 0.172 |
| Propyl parahydroxybenzoate (preservative), g. | 0.094 |
| Water, distilled, to make 1 liter. | |

To this suspension, various sweetening and flavoring agents, as well as acceptable colors, may be added by choice. The suspension contains approximately 25 mg. of antibiotic activity per milliliter.

EXAMPLE 27

A solution of 6-demethyl-6-chloromethyltetracycline is prepared with the following compositions:

| | |
|---|---|
| Antibiotic, g. | 30.22 |
| Magnesium chloride hexahydrate, g. | 12.36 |
| Monoethanolamine, ml. | 8.85 |
| Propylene glycol, g. | 376 |
| Water, ml. | 94 |

The solution has a concentration of 50 mg./ml. and is suitable for parenteral and especially for intramuscular administration.

EXAMPLE 28

A tablet base is prepared by blending the following ingredients in the proportion by weight indicated:

| | |
|---|---|
| Sucrose, U.S.P. | 80.3 |
| Tapioca starch | 13.2 |
| Magnesium stearate | 6.5 |

Into this base there is blended sufficient 6-demethyl-6-chloromethyltetracycline to provide tablets containing 25, 100 and 250 mg. of active ingredient.

EXAMPLE 29

A blend is prepared containing the following ingredients:

| | |
|---|---|
| Calcium carbonate, U.S.P. | 17.6 |
| Dicalcium phosphate | 18.8 |
| Magnesium trisilicate, U.S.P. | 5.2 |
| Lactone, U.S.P. | 5.2 |
| Potato starch | 5.2 |
| Magnesium stearate A | 0.8 |
| Magnesium stearate B | 0.35 |

To this blend is added sufficient 6-demethyl-6-chloromethyltetracycline to provide capsules containing 25, 100 and 250 mg. of active ingredient.

EXAMPLE 30

One thousand grams of 6-demethyl-6-chloromethyltetracycline are intimately mixed and ground with 2500 grams of ascorbic acid. The ground, dry mixture is filled into vials, sterilized with ethylene oxide and the vials sterilely stoppered. For intravenous administration sufficient water is added to the vials to form a solution containing 10 mg. of active ingredient per milliliter.

EXAMPLE 31

11a-fluorotetracycline-6,12-hemi-ketal

To a suspension of 20 g. of tetracycline base in 800 ml. of water cooled to 0° C. is added 45 ml. (2 equivalents) of 2 N sodium hydroxide solution. The tetracycline dissolves to yield a solution of pH approximately 11. Perchloryl fluoride is then bubbled through the stirred solution (maintained under a nitrogen atmosphere) until the pH of the mixture approximates 7. A heavy precipitate starts to form between pH 8 and 8.5. The excess perchloryl fluoride is flushed out with a stream of nitrogen and the nearly white crystalline material is filtered off, washed with water and dried under vacuum at room temperature to obtain 7.9–8.5 g. of product. Ultraviolet absorption shows maxima at 267 and 340 m$\mu$; infrared shows no carbonyl absorption below 6 microns. Bioassay against *K. pneumoniae* shows an activity of 8 mcg./mg. on the tetracycline scale. Elemental analysis gives the following results.

Calcd. for: $C_{22}H_{23}N_2O_8FH_2O$: C, 54.95; H, 5.20; N, 5.83. Found: C, 54.97; H, 5.19; N, 5.85.

EXAMPLE 32

11a-chlorotetracycline-6,12-hemi-ketal

To a solution of 2.2 g. of anhydrous tetracycline in 25 ml. of monoglyme (dimethyl ether of ethylene glycol) is added 800 mg. of N-chlorosuccinimide with stirring to dissolve the reagent. The mixture is allowed to stand for seven minutes and then diluted with water (25 ml.). The product, 873 mg., crystallizes as white needles. Bioassay of the product shows a tetracycline activity of about 4 mcg./mg. against *K. pneumoniae*. Infrared analysis shows no carbonyl bands between 5 and 6 microns. Ultraviolet absorption shows maxima at 267 and 340–342 m$\mu$.

On treatment of this product with sodium hydrosulfite in aqueous dimethylformamide at room temperature, tetracycline is regenerated. Bioassay of the reaction mixture shows a tetracycline activity of 520–665 mcg./mg. (*K. pneumoniae*).

The crystalline hydrochloride of this product is obtained by dissolving it in excess aqueous HCl (pH ca. 1) and freeze drying the mixture.

EXAMPLE 33

7,11a-dichlorotetracycline-6,12-hemi-ketal

A mixture of 2.4 g. of anhydrous 7-chlorotetracycline, 800 mg. of N-chlorosuccinimide and 25 ml. of the dimethyl ether of ethylene glycol is stirred for 2½ minutes after which 100 ml. of ether is added followed by 300 ml. of hexane. The precipitate thus formed is collected by filtration, washed with hexane and dried.

In similar fashion, 7-bromo-11a-chlorotetracycline-6,12-hemi-ketal is prepared from 7-bromotetracycline.

What is claimed is:
1. 6-demethyl-6-chloromethyl-5a,6-anhydrotetracycline.
2. 9-bromo-6-demethyl - 6 - bromomethyl - 5a,6 - anhydrotetracycline.
3. A compound selected from the group consisting of compounds of the formula:

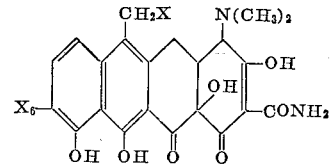

wherein X is selected from the group consisting of chloro, bromo and iodo and $X_6$ is selected from the group consisting of hydrogen, chloro, bromo, iodo, nitro and amino; the acid addition salts thereof and the pharmaceutically acceptable metal salts thereof.
4. 6 - demethyl-6-bromomethyl - 5a,6 - anhydrotetracycline.
5. 9-chloro-6-demethyl - 6 - chloromethyl - 5a,6 - anhydrotetracycline.

References Cited by the Examiner

UNITED STATES PATENTS

| | | | |
|---|---|---|---|
| 2,895,993 | 7/1959 | Stephens | 260—559 |
| 3,093,684 | 6/1963 | Soder et al. | 260—599 |
| 3,145,228 | 8/1964 | Von Wittenau et al. | 260—559 |
| 3,148,212 | 9/1964 | Boothe et al. | 260—559 |
| 3,165,551 | 1/1965 | Blackwood et al. | 260—559 |
| 3,180,889 | 4/1965 | Hlavka et al. | 260—559 |
| 3,183,267 | 5/1965 | Blackwood et al. | 260—559 |

FOREIGN PATENTS 243,095 10/1959 Australia.

OTHER REFERENCES

Boothe et al.: Journal American Chemical Society, vol. 82, pages 1253–55, 1960.

ALEX MAZEL, *Primary Examiner.*

HENRY R. JILES, *Examiner.*

JAMES W. ADAMS, *Assistant Examiner.*